(12) United States Patent
Myers (10) Patent No.: US 6,581,499 B2
(45) Date of Patent: Jun. 24, 2003

(54) AUTOMATED PIPE CUTTER TOOL BOX

(76) Inventor: Kent J. Myers, 9090 Stallion Rd., Magnolia, OH (US) 44643

( * ) Notice: Subject to any disclaimer, the term of this patent is extended or adjusted under 35 U.S.C. 154(b) by 0 days.

(21) Appl. No.: 09/835,477

(22) Filed: Apr. 16, 2001

(65) Prior Publication Data

US 2002/0148333 A1 Oct. 17, 2002

(51) Int. Cl.[7] .............................. B23B 3/22; B23B 5/16; B23D 21/08
(52) U.S. Cl. ................. 82/113; 82/123; 30/93
(58) Field of Search .................. 82/113, 114, 115, 82/156; 15/104.05, 104.03, 21.1; 30/93, 92, 123, 102, 94, 95, 101; 144/1.11, 2.11

(56) References Cited

U.S. PATENT DOCUMENTS

| | | | | |
|---|---|---|---|---|
| 410,398 | A | * 9/1889 | Bogardus | 144/1.1 |
| 536,554 | A | * 3/1895 | Vinton | 30/102 |
| 633,203 | A | * 9/1899 | Makinen | 108/36 |
| 1,411,122 | A | 3/1922 | Morrison | |
| 1,877,198 | A | 9/1932 | Readey | |
| 1,932,462 | A | * 10/1933 | Howlett | 29/69 |
| 2,079,180 | A | 5/1937 | Pealer | |
| 2,563,483 | A | * 8/1951 | O'hagan | 30/123 |
| 3,146,526 | A | 9/1964 | Bollin | |
| 3,545,081 | A | * 12/1970 | Butler | 108/132 |
| 4,173,849 | A | * 11/1979 | Mar | 144/1.1 |
| 4,349,928 | A | 9/1982 | Mlikotin | 7/157 |
| 4,827,816 | A | 5/1989 | Takaniemi | |
| 5,088,196 | A | 2/1992 | Fukuda | 30/102 |
| 5,315,759 | A | * 5/1994 | Mashata | 90/12 |
| 5,829,142 | A | 11/1998 | Rieser | 30/93 |
| 6,209,597 | B1 | * 4/2001 | Calcote | 144/1.1 |

FOREIGN PATENT DOCUMENTS

| DE | 296 11 209 | 8/1996 |
|---|---|---|
| EP | 0 589 824 A | 3/1994 |
| WO | 99 29473 A | 6/1999 |

OTHER PUBLICATIONS

Patent Abstracts vol. 2000, No., 02 Mar. 29, 2000 & JP 11 30052 A (Higuchi Densetsu KK) Nov. 2, 1999.

Patent Abstracts of Japan vol. 010, No. 273 (M–518) Sep. 17, 1986 & JP 61 095817A (Mitsubishi Steel Mfg. Co. Ltd.) May 14, 1986 Abstract.

Patent Abstracts of Japan vol. 2000, No. 08, Oct. 6, 2000 & JP 2000 127087 A (Sankin:KK; Toho Konekkusu KK, May 9, 2000.

* cited by examiner

Primary Examiner—Steven C. Bishop
Assistant Examiner—Don J Bleasdell
(74) Attorney, Agent, or Firm—Renner, Kenner, Greive, Bobak, Taylor & Weber (57) ABSTRACT

The present invention provides a pipe cutter apparatus that includes a housing having a base and lid. The lid is moveable between a storage position and an operative position. A motor is retained within the housing and has a shaft operatively connected thereto and rotated thereby. A cutting wheel extends radially from the shaft and is rotated with the shaft. A pipe conveyor is also retained within the housing, adjacent the cutting wheel. The pipe conveyor may be operated to urge a pipe placed therein into engagement with the cutting wheel. The pipe conveyor is preferably adjustable to receive pipes of various diameters. Notably, when the lid is in the operative position, a work area is provided for cutting a pipe or similar work piece. When the lid is in the storage position, a carrying case is provided such that the pipe cutter apparatus is readily portable. A cleaning brush also extends from the shaft that is rotated by the motor. Various embodiments for the cutting wheel, conveyor, and cleaning brush elements are provided.

18 Claims, 5 Drawing Sheets

AUTOMATED PIPE CUTTER TOOL BOX

BACKGROUND OF THE INVENTION

The present invention generally relates to pipe cutters and, more particularly, to a portable, automated pipe cutter apparatus providing a stable work area and useful accessories for cutting, reaming, cleaning/polishing, and otherwise preparing piping or tubing and their fittings for assembly at a job site.

Conventional pipe cutters are well known in the art and generally include a cutting wheel and rollers arranged to engage or clamp a pipe, tubing, or similar work piece. The position of the rollers relative to the cutting wheel is adjustable to accommodate pipes having various diameters. Once the pipe is clamped between the cutting wheel and the rollers, the pipe may be cut by revolving the cutting wheel around the pipe. Thus, the pipe is held in one hand while the cutter is held in the other and manipulated to rotate about the pipe. Additionally, during a cutting operation, the conventional pipe cutter is manipulated to incrementally decrease the distance between the cutting wheel and the rollers and thereby incrementally increase the depth to which the cutting wheel penetrates the pipe clamped therebetween. Thus, cutting piping, tubing, or similar work pieces with conventional pipe cutters is known to be a tedious, hands-on task.

More recently, motorized pipe cutters have been proposed and are provided in the prior art. Typically, these automated pipe cutters either involve turning the pipe by rollers being turned by a motor or employ cutting instruments that actually saw through the pipe, causing substantial safety concerns and producing debris in the form of saw blade shavings from the pipe. Additionally, these automated pipe cutters have attempted to maintain the hand-held nature of the more traditional pipe cutters, and still require the pipe to be held in one hand and the pipe cutter to be held in the other. These automated pipe cutters are seen as requiring the tedious manipulation of both pipe and pipe cutter, as with the more traditional pipe cutters widely known in the art.

Thus, there exist a need in the art for a pipe cutter apparatus that does not require the constant manipulation of both the pipe to be cut and the pipe cutter itself. Additionally, there exist a need in the art for a pipe cutter apparatus that includes useful accessories for conditioning external pipe surfaces or internal pipe fitting surfaces. The prior art has attempted to provide automated and manually manipulated deburring tools and brushes for such conditioning, but the present invention does so through an efficient and user-friendly design heretofore unknown in the art.

SUMMARY OF THE INVENTION

In general, the present invention provides a pipe cutter apparatus that includes a housing having a base and lid. The lid is moveable between a storage position and an operative position. A motor is retained within the housing and has a shaft operatively connected thereto and rotated thereby. A cutting wheel extends radially from the shaft and is rotated with the shaft. A pipe conveyor is also retained within the housing, adjacent the cutting wheel. The pipe conveyor may be operated to urge a pipe placed therein into engagement with the cutting wheel. Notably, when the lid is in the operative position, a work area is provided for cutting a pipe or similar work piece. When the lid is in the storage position, a carrying case is provided such that the pipe cutter apparatus is readily portable.

Another embodiment of the present invention generally provides a pipe cutter apparatus including a motor, a shaft operatively connected to and rotated by the motor, and a cutting wheel extending radially from the shaft and rotated therewith. A pipe conveyor is provided adjacent the cutting wheel and is operable to urge a pipe placed therein into engagement with the cutting wheel. When a pipe is placed in the pipe conveyor and caused to engage the cutting wheel, the operation of the motor to rotate the shaft and the cutting wheel causes the pipe to be rotated by the cutting wheel such that the pipe and the pipe cutter apparatus do not have to be simultaneously manipulated. The cutting wheel is neither rotated about the pipe nor is the pipe rotated against the cutting wheel by some external manual or automated force. Rather, the rotation of the cutting wheel itself, and its engagement with the pipe, causes the pipe to rotate so that the cutting wheel cuts about the entire circumference of the pipe.

A further embodiment of the present invention provides a pipe cutter apparatus including a motor, a shaft operatively connected to and rotated by the motor, a cutting wheel extending radially from the shaft and rotated therewith, a cleaning brush attached to the shaft and rotated therewith, and a pipe conveyor adjacent the cutting wheel and operable to urge a pipe placed therein into engagement with the cutting wheel. In this embodiment, a pipe may be cut by the cutting wheel and thereafter, conditioned with a cleaning brush to prepare the pipe for a given application. Pipe fittings may also be treated with the cleaning brush.

PREFERRED EMBODIMENT FOR CARRYING OUT THE INVENTION

Figure 1:
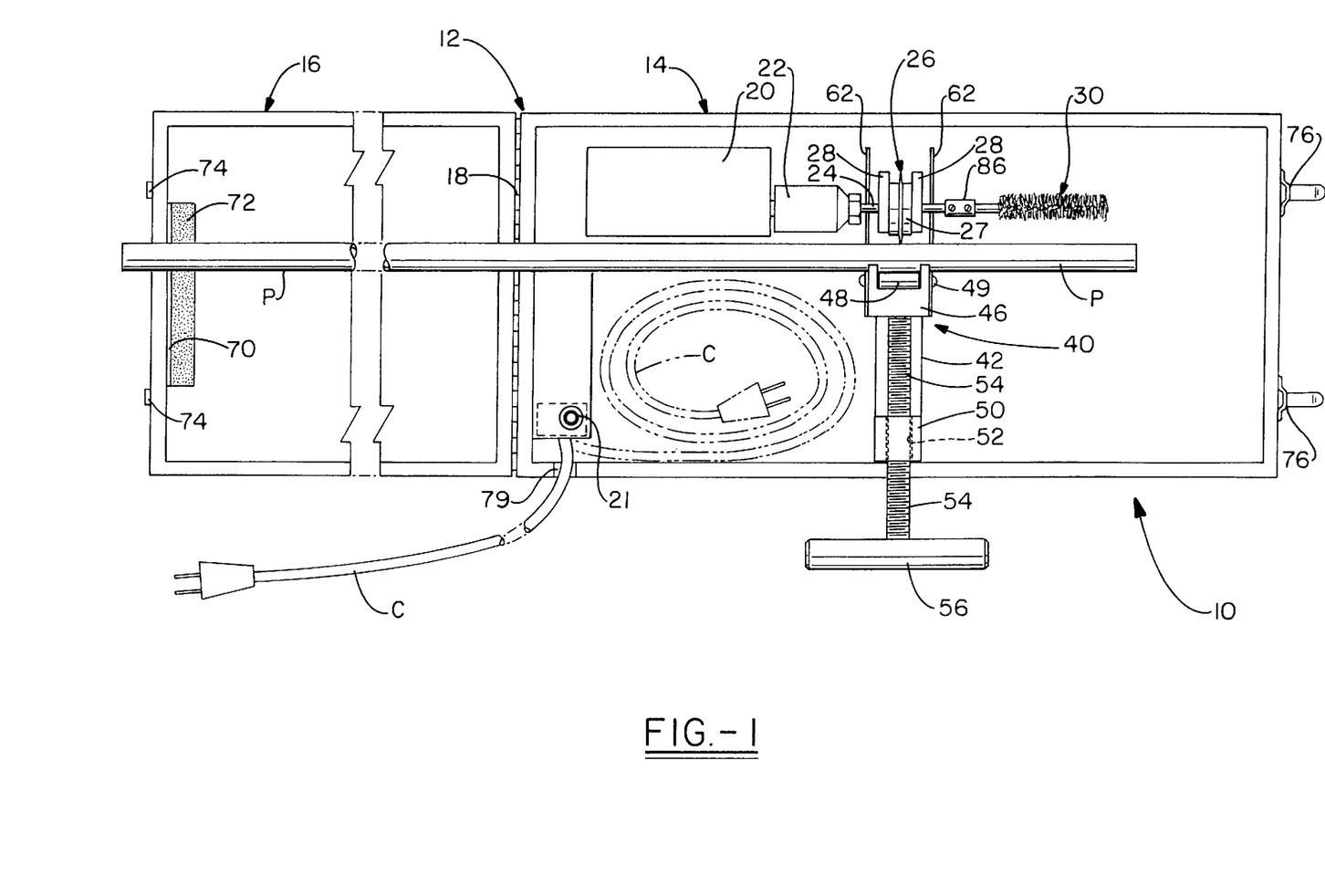
FIG. 1 is a top plan view of a pipe cutter apparatus in accordance with the present invention showing the box with its cover in the open position and a length of pipe in position for being cut.
Figure 2:
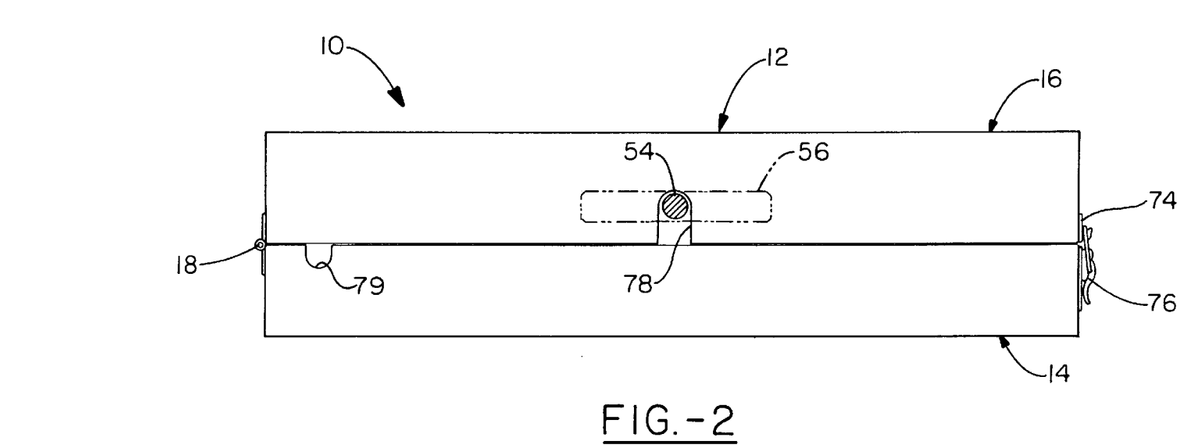
FIG. 2 is a side elevational view of the tool box shown in FIG. 1 with the housing in the closed and locked position.

Referring now to FIG. 1, a pipe cutter apparatus according to the present invention is designated therein by the numeral 10. Pipe cutter apparatus 10 includes housing 12 having base 14 and lid 16 that are connected by hinges 18 such that housing 12 may open to an operative position (FIG. 1) and close to a storage position (FIG. 2). Generally, housing 12 may open to provide a work area for cutting pipe, and may close to provide a carrying case for the elements of pipe cutter apparatus 10. It should therefore be appreciated that the pipe cutter apparatus 10 is portable in its preferred embodiment.

Retained substantially within base 14 is motor 20, which may be activated by a typical on/off switch 21 to rotate chuck 22. Power may be supplied to motor 20 either by batteries or by suitable connection with an alternating current (AC) or direct current (DC) source. A switch 23 will typically be used to selectively supply and cut off power to motor 20. Motor 20 may be enclosed in a motor housing to provide safety from the moving parts of the motor 20.

Chuck 22 releasably engages shaft 24. Shaft 24 extends from chuck 22 of motor 20 and is rotated thereby about its longitudinal axis. Cutting wheel 26 extends radially from shaft 24. Thus, cutting wheel 26 is rotated with shaft 24 by motor 20, and performs the cutting operation on a pipe or other work piece. In one embodiment of the present invention, motor 20 and chuck 22 are a power drill. Advantageously, in such an embodiment, chuck 22 may be released from shaft 24, thus providing a power drill that is detachable from cutter apparatus 10.

Although optional, it is preferred that cutting wheel 26 be integral with a hub 27 that insubstantially bounded by protective plates 28 for the purpose of providing safety from cutting wheel 26 during rotation thereof. In the embodiment as shown in FIG. 1, cleaning brush 30 is provided at the distal end of shaft 24, outside of distal plate 28.

A pipe conveyor, generally represented by the numeral 40 in FIG. 1, is provided to urge a pipe or other work piece toward cutting wheel 26 to thereby effect a cutting operation. It should be appreciated that the embodiment for pipe conveyor 40, as disclosed herein, is merely the preferred means for carrying out this operation. Thus, other embodiments of a pipe conveyor may be employed and yet fall within the scope of the present invention.

Figure 3:
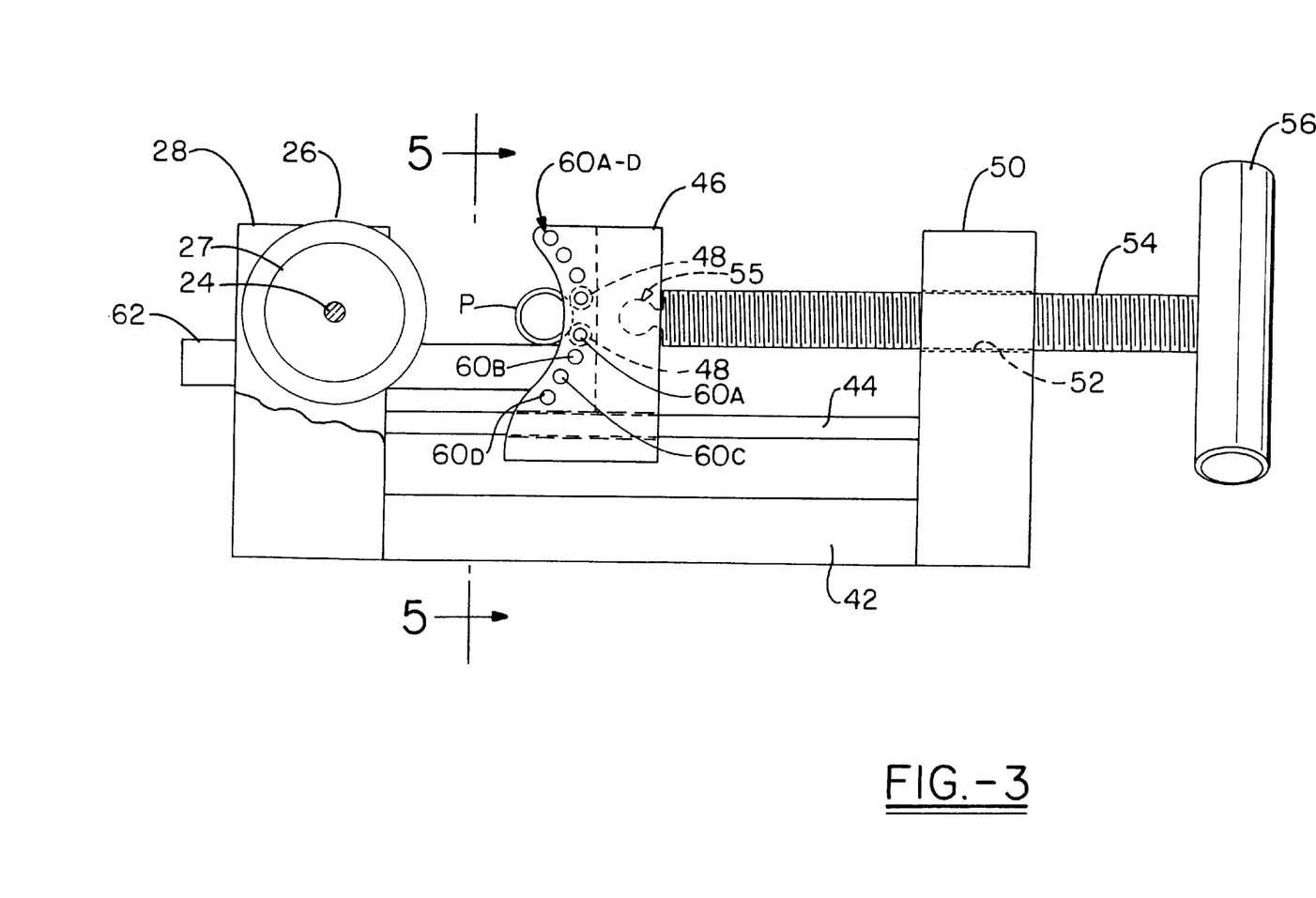
FIG. 3 is an enlarged side elevational view of a pipe cutting assembly with some elements removed to expose pipe conveyor members of the assembly.
Figure 4:
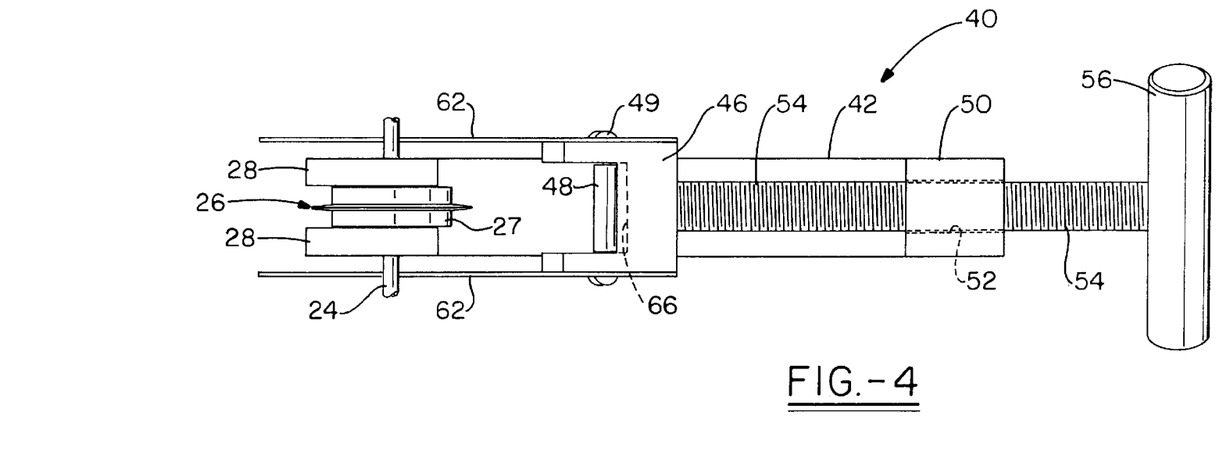
FIG. 4 is a top view of the pipe cutting apparatus shown in FIG. 3.
Figure 5:
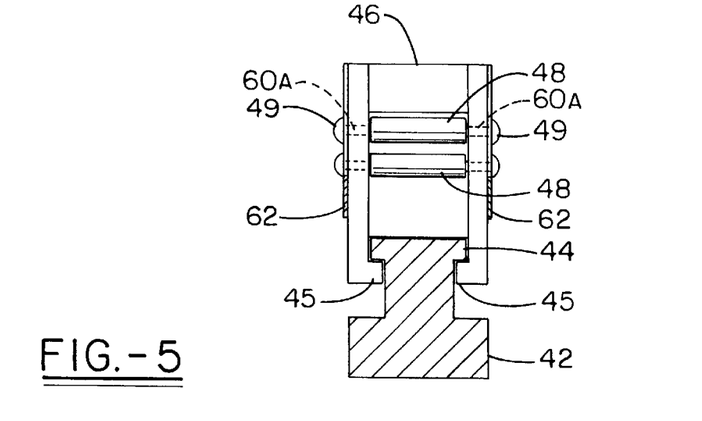
FIG. 5 is a front elevational view, in cross-section, of the apparatus shown in FIG. 3 as may be taken at line 5—5 thereof.

With reference to FIGS. 3, 4, and 5, it can be seen that pipe conveyor 40 includes guide rail 42 having a flange 44 thereon for communication with flanges 45 on guide housing 46. That is, the flanges 45 of guide housing 46 communicate with flange 44 so as to retain guide housing 46, in a stable manner, on rail 42, while, at the same time, being movable thereon from a position distal from cutting wheel 26 to a position proximate cutting wheel 26.

Guide housing 46 includes guide rollers 48, which aid in the retention of a pipe during a cutting operation. Guide housing 46 is maintained on guide rail 42 between cutting wheel 26 and guide plate 50. Guide plate 50 is affixed to guide rail 42, and provides threaded aperture 52. Threaded rod 54 extends through threaded aperture 52 and is attached to guide housing 46 at one end by an appropriate rotary joint or union, generally represented in FIG. 3 by the numeral 55. Handle 56 is connected to the other end of threaded rod 54 such that rotation of handle 56 in one direction advances threaded rod 54 through threaded aperture 52, and, thus, guide housing 46 and guide rollers 48 are urged along guide rail 42 toward cutting wheel 26. Rotation of handle 56 in the opposite direction urges the same away from wheel 26.

Pins 49 serve as bearings that allow guide rollers 48 to rotate within guide housing 46. Pins 49 are selectively received in a chosen pin aperture 60A, 60B, 60C, 60D. More particularly, two pins 49 and two rollers 48 are symmetrically positioned about a general centerline of guide housing 46 (thus directly opposed pin apertures receive similar numerical identifiers 60A–D).

Guide rollers 48 are preferably about ⅜ of an inch in diameter. Pin apertures 60A are preferably spaced so that, when pins 49 and guide rollers 48 are receive therein, they receive a pipe P that may be anywhere from about ¼ to about ¾ inches in diameter. Pin apertures 60B are preferable spaced so as to be capable of receiving a pipe, via guide rollers 48 received therein, that is anywhere from about 1 inch to about 2½ inches in diameter, with pin apertures 60D being spaced to accommodate even larger pipes. Pin apertures 60C are spaced even wider, and are capable of receiving a pipe, via guide rollers 48 received therein, that is greater than about 2½ inches in diameter. Notably, as can be seen in FIG. 3, pin apertures 60A, 60B, 60C, 60D are positioned on a curve so as to facilitate, via pins 49 and guide rollers 48, the selective accommodation of pipes of various diameters.

Figure 6:
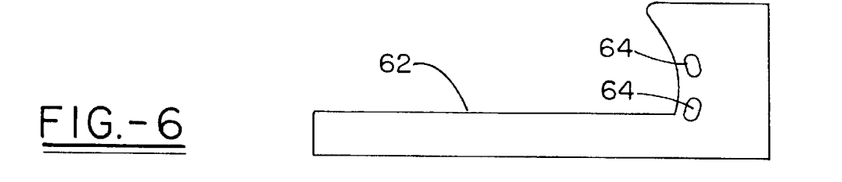
FIG. 6 is a side elevational view of a pipe guide member, the one nearest the viewer in FIG. 3 being removed from the assembly.

Pipe P is contacted and retained by at least three contact points, by cutting wheel 26 and the two rollers 48. Optionally, pipe guides 62 may be provided to help urge pipe P to nest between these contact points. Referring now to FIG. 6, pipe guides 62 are generally L-shaped plates having apertures 64 that receive pins 49 of the guide rollers 48. A pipe guide 62 is employed on both sides of guide housing 46, and each extends on either side of protective plates 28 as guide housing 46 is brought into close proximity to cutting wheel 26. A pipe P may be placed across the two pipe guides 62 such that contact between cutting wheel 26 and pipe P will cause pipe P to be urged into its nesting position between contact points with cutting wheel 26 and guide rollers 48 as shown in FIG. 1 and readily perceived in FIG. 3. Pipe guides 62 are moved according to the selected placement of the lower guide roller 48, such that this nesting function is facilitated despite the size of pipe P. As seen in FIG. 3, wherein one pipe guide 62 has been removed to enable viewing of elements of pipe conveyor 40, pins 49 re inserted through both apertures 64 to retain guide rollers 48 in apertures 60A, when the pipe cutter 10 is used to cut smaller pipes. When larger pipes are to be cut, the lower aperture 64 of pipe guide 62 receives pin 49, which retains the lower guide roller 48, but the upper guide roller 48 will communicate with a pin 49 that does not communicate with upper aperture 64 of pipe guide 62. Thus, the guide rollers 48 may be set wider than apertures 64.

When a pipe P is maintained in this manner, it may be readily cut by pipe cutter apparatus 10. To cut pipe P, handle 56 is rotated to provide enough distance between rollers 48 and cutting wheel 26 for the insertion of pipe P therebetween. Then, handle 56 is rotated in the opposite direction to lightly press pipe P between cutting wheel 26 and rollers 48. Motor 20 is then turned on to rotate shaft 24 and cutting wheel 26. Advantageously, as cutting wheel 26 rotates, pipe P is rotated against rollers 48, which also rotate to accommodate this movement. Thus, once the cutting operation is begun, the pipe does not need to be further manipulated as with the typical pipe cutters of the prior art. Within fractions of a second, pipe P is rotated multiple times and cutting wheel 26 creates a groove in pipe P by pushing pipe material to the side and/or inward toward the center of pipe P. The depth of this groove is increased by incrementally turning handle 56 to close the distance between housing 46 and cutting wheel 26, thereby causing cutting wheel 26 to bite further into pipe P and eventually cut pipe P as desired.

With reference to the top view of conveyor 40 shown in FIG. 4, it will be appreciated that the top of guide housing 46 is preferably recessed as depicted at numeral 66. By providing a recessed top to guide housing 46, the alignment of pipe P with respect to cutting wheel 26 can readily be viewed and adjusted.

Notably, the largest cutting wheels currently available in the prior art have a maximum diameter of 1¼ inch. While cutting wheels of the prior art may be used to practice the present invention, it is here noted that the preferred cutting wheel of the present invention is designed to have a diameter of at least 2 inches. A cutting wheel of this size facilitates the cutting operation by causing pipe P to be rotated against rollers 48. This is seen as a significant advantage, as there is no need to further manipulate the pipe once the cutting operation has begun. More preferably, cutting wheel 26 has a diameter of 2½ inches.

Motor 20 preferably rotates shaft 24 at a rate somewhere between 400 to 2000 revolutions per minute and, more preferably, between 400 to 1000 rpm. Thus, the cutting of pipe P can occur quite rapidly. Indeed, once pipe P is pressed lightly between cutting wheel 26 and rollers 48, and motor 20 is activated, handle 56 may be rotated at a moderate rate to constantly advance cutting wheel 26 against pipe P to cut through pipe P very quickly.

As seen in FIG. 1, lid 16 opens off of base 14 to provide a substantial work area for cutting pipes. In a preferred embodiment, lid 16 includes an adjustable bracket 70 across which a longer pipe may be laid for support during a cutting operation. Adjustable bracket 70 can be raised and lowered to accommodate different sizes of pipe as they are laid across the lid 16 and base 14 portions of housing 12 in order to be cut. A cushion 72 is preferably provided on adjustable bracket 70 to serve as a buffer between pipe P and adjustable bracket 70 while the pipe is being rotated and cut by cutting wheel 26. Most pipes are not truly straight, and tend to wobble a little while being cut. Cushion 72 dampens the vibration caused by a wobbling pipe.

As seen in FIGS. 1 and 2, lid 16 also preferably includes clasp elements 74 that communicate with mating clasp elements 76 on a base 14 to provide pipe cutter apparatus 10 with a built in carrying case function. In the embodiment shown, threaded rod 54 and handle 56 extend outward of housing 12, and lid 16 is provided with notch 78 to accommodate threaded rod 54 SO that handle 56 can protrude from the interior of housing 12 and provide a means for carrying pipe cutter apparatus 10. Of course, threaded rod 54 and handle 56 could be completely retained within the interior of housing 12, and a separate external handle could be provided. Notch 79 is provided to accommodate a power card C, if such is used to power motor 20.

The form and function of a cleaning brush, such as cleaning brush 30 of FIG. 1, is now considered. In FIG. 1, it can be seen that shaft 24 extends onward from cutting wheel 26, exteriorly of distal protective plate 28, to a suitable coupling 86, and cleaning brush 30 is coupled thereto. Cleaning brush 30 rotates with shaft 24 and may be used to condition the external surfaces of pipes or the internal surfaces of pipe fittings as may be required for a given application. For instance, the internal and/or external surfaces of both pipes and pipe fittings generally must be deburred and cleaned before the pipe and pipe fittings are sweat fit or otherwise joined together.

Figure 7:
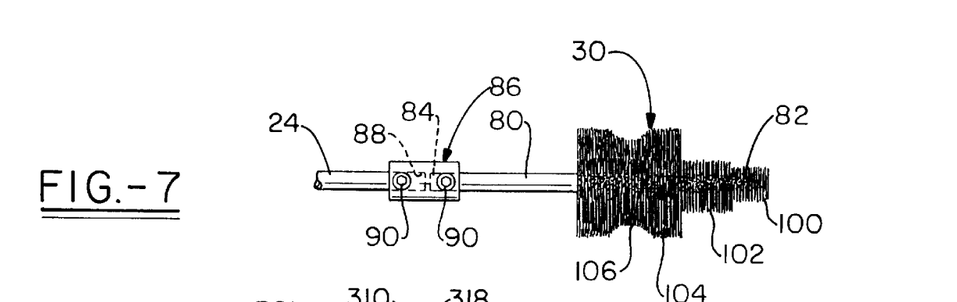
FIG. 7 is a side elevational view of a cleaning brush member as may be employed for finishing a pipe cut end.

With reference to FIG. 7, a preferred embodiment for brush 30 is disclosed. In this embodiment, brush 30 is specially shaped to provide, in one device, a multitude of brushing functions. Brush 30 is maintained on a shaft 80. Shaft 80 is completely covered at end 82 thereof by brush 30. The opposite end 84 of shaft 80 is received in coupling 86, which also receives shaft 24. Both shaft 80 and shaft 24 are received in bore 88 of coupling 86 and are retained therein by set screws 90. Upon removal of set screws 90, shafts 80 and 24 may be removed such that brush 30 can be replaced when worn.

Brush 30 includes a distal portion 100, a mid portion 102, and a grooved portion 104. Distal portion 100 is of a smaller diameter than mid portion 102, which is of smaller diameter than grooved portion 104. Thus, the interior surfaces of pipes of various diameters may be easily cleaned with brush 30. It is best if a brush intimately contacts the entire circumference of the internal surface of a pipe during a brushing operation. When the brush fits the interior of a pipe in this manner, the pipe does not have to be repeatedly rotated to ensure that the entire circumference is brushed. Thus, in another embodiment of the present invention, distal portion 100 has a half inch diameter, mid portion 102 has a three-quarter inch diameter, and grooved portion 104 has, along a substantial length, a 1½ inch diameter.

In such an embodiment, distal end 100 would be used to clean half inch fittings, mid portion 102 would be used to clean three-quarter inch fittings, and grooved portion 104 would be used to clean larger fittings. Grooved portion 104 is also preferably designed with groove 106, which facilitates the brushing of the external surface area of a pipe. During rotation of brush 30, groove 106 provides an area for intimate receipt of the external surface of a pipe, and thereby intimately and efficiently brushes the external surface.

Despite the foregoing disclosure with respect to a preferred embodiment for brush 30, it should be readily apparent that brush 30 need not take this preferred form. Rather, other shapes and types of brushes may be employed and, additionally, may be attached to shaft 24 in various manners. The present design and attachment of brush 30 is merely one preferred embodiment in light of its practical, functional benefits.

Figure 8:
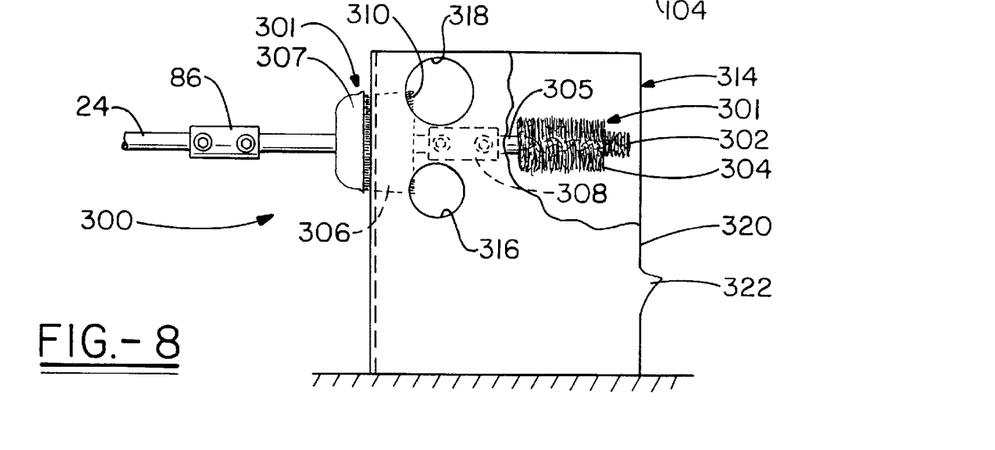
FIG. 8 is a side elevational view of another embodiment of a cleaning brush member.

A preferred embodiment for a brush assembly is provided in FIG. 8 and designated therein by the numeral 300. Brush assembly 300 includes brush portion 301, which, like brush 30, rotates with shaft 24 and is operatively connected thereto. Brush 301 includes a distal portion 302 and mid-portion 304, much like distal portion 100 and mid-portion 102, respectively, of brush 30. Brush 301 also includes a base portion 306 distanced from mid-portion 304 by a coupling 308 that functions like coupling 86. Distal portion 302 and mid-portion 304 extend from a shaft 305 that is received in coupling 308. Base portion 306 extends from base plate 307 proximate sleeve 308 and provides a brushing surface 310.

In this or other embodiments, brush 301 is optionally substantially enclosed by a brush housing 314 having a small aperture 316 and large aperture 318 therein. Small aperture 316 and large aperture 318 are sized so as to receive pipes of selected diameters. Apertures 316, 318 thus serve as guides for brushing the outside of pipes. Particularly, a pipe may be inserted through one of either aperture 316 or 318 so as to contact, with its exterior surface, brushing surface 312. Coupling 308, which is typically made of metal, provides a surface upon which the pipe may rest with little friction during the brushing operation. The interiors of pipes may be brushed by placing the pipe over distal portion 302 or mid-portion 304. Notably, cover 314 is not closed at distal end 320 and, therefore, pipes may be brought in contact with portions 302 and 304 of brush 301. Cover 314 provides protection from debris that may be thrown from the pipe being brushed.

Optionally, cover 314 may include deburring tool 322, a substantially triangular shaped metal extension that may be used to ream/debur the interior of the cut end of a pipe. It should be appreciated that such a deburring tool may optionally be provided as a fixed tool on cutting apparatus 10, at any number of positions.

Figure 9:
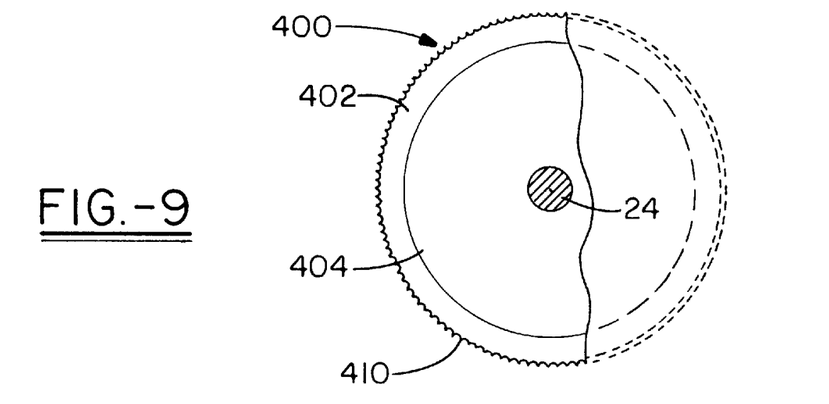
FIG. 9 is an elevational view of an embodiment of a cutting wheel having saw teeth elements for cutting plastic pipes.
Figure 10:
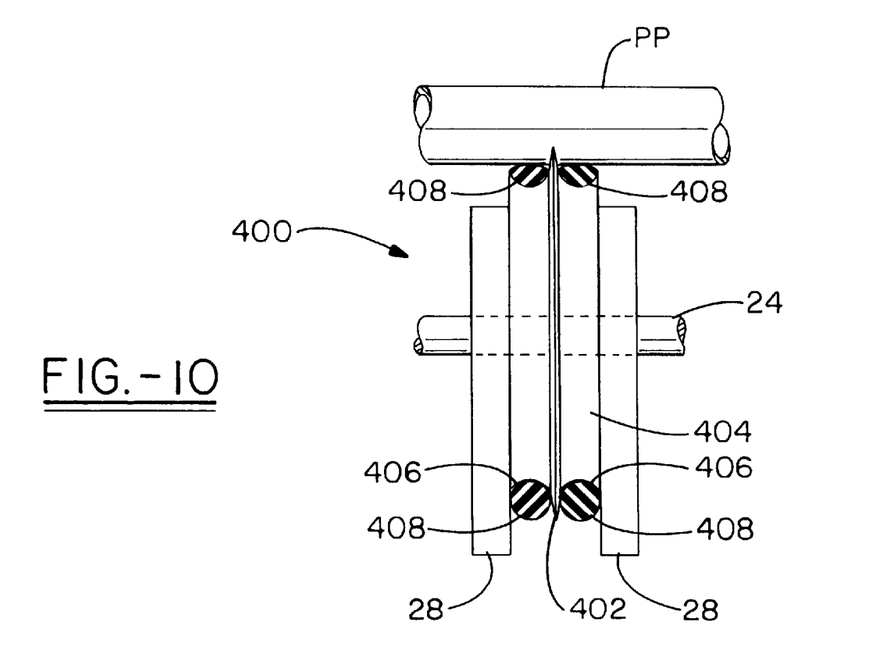
FIG. 10 is a side elevational view, in cross-section, of the cutting wheel embodiment of FIG. 9, shown with protective plates and generally depicting a cutting operation on a plastic pipe.

The pipe cutter of the present invention may also be adapted to cut plastic pipes. Therefore, with reference to FIGS. 9 and 10, a means for cutting plastic pipe is disclosed as an alternative to cutting wheel 26. Referring now to FIG. 10, it can be seen that a plastics cutting wheel is designated therein by the numeral 400. Cutting wheel 400 includes serrated disc 402, which extends from hub 404 and is integral therewith, as with cutting wheel 26 and hub 27. Hub 404 provides grooves 406 on each side of serrated disc 402. Grooves 406 receive o-rings 408 such that serrated disc 402 is sandwiched between o-rings 408 on each side thereof. O-rings 408 extend slightly beyond the peripheral edge of serrated disc 402, which, as can be seen in FIG. 9, is serrated with saw teeth 410. Thus, saw teeth 410 are inset from the outer surfaces of o-rings 408. The entire composite structure is retained on shaft 24 between protective plates 28.

When cutting wheel 400 is provided on apparatus 10, plastic piping may be cut. As described with respect to FIG. 1, a plastic pipe is place between cutting wheel 400 and pipe conveyor 40, and is lightly pressed between cutting wheel 400 and rollers 48. Motor 20 is then turned on to rotate shaft 24 and cutting wheel 400. Advantageously, o-rings 408, which are preferably made of rubber or a similar material, extend beyond saw teeth 410 such that o-rings 408 make the first contact with the plastic pipe, and, as cutting wheel 400 rotates, the plastic pipe is rotated against rollers 48 due to the friction between o-rings 408 and the plastic pipe. As generally shown in FIG. 10, o-rings 408 are pressed inward by the contact with the plastic pipe PP, and saw teeth 410 PP make contact with plastic pipe PP. As the pressure is increased between pipe PP and cutting wheel 400 by advancement of conveyor 40 (not shown), cutting wheel 400 begins to create a groove in pipe PP, while pipe PP is rotated multiple times. The depth of the groove is increased by the incrementally advancing pipe conveyor 40 toward cutting wheel 400. Within seconds, or even fractions of a second, a plastic pipe may be cut completely through by a cutting wheel 400.

In light of the foregoing, it should thus be evident that the process of the present invention, providing an automated pipe cutter, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A pipe cutter apparatus comprising:
   a housing having a base and a lid, which is movable between a storage position and an operative position;
   a motor retained within said housing;
   a shaft operatively connected to and rotated by said motor;
   a cutting wheel extending radially from said shaft and rotated therewith;
   a pipe conveyor adjacent said cutting wheel and operable to urge a pipe placed therein into engagement with said cutting wheel, wherein said housing, when said lid is in said operative position, provides a work area for cutting pipe, and, when said lid is in said storage position, provides a carrying case.

2. The pipe cutter apparatus of claim 1, wherein, when a pipe is placed in said pipe conveyor and caused to engage said cutting wheel, the operation of said motor to rotate said shaft and said cutting wheel causes said pipe to be rotated by said cutting wheel.

3. The pipe cutter apparatus of claim 1, wherein said pipe conveyor comprises:
   a guide rail extending substantially perpendicularly in relation to said shaft and substantially aligned with and parallel to said cutting wheel;
   a guide housing movably received on said guide rail and including at least two guide rollers;
   a guide plate having a threaded bore, said guide plate aligned with said guide rail such that said guide housing is disposed between said guide plate and said cutting wheel;
   a threaded rod extending through said threaded bore and connected to said guide housing at one end thereof;
   a handle connected to said threaded rod at the other end thereof such that rotation of said handle in one direction urges said guide housing along said guide rail toward said cutting wheel, and rotation of said handle in an opposite direction urges said guide housing along said guide rail away from said cutting wheel.

4. The pipe cutter apparatus of claim 1, further comprising an adjustable bracket on said lid and positioned such that a pipe placed orthoganol to said cutting wheel and in contact with said cutting wheel may rest upon said adjustable bracket.

5. The pipe cutter apparatus of claim 1, further comprising a cleaning brush operatively connected to said shaft at a distal end thereof.

6. The pipe cutter apparatus of claim 2, wherein said cutting wheel has a diameter of at least about two inches.

7. The pipe cutter apparatus of claim 3, wherein said guide housing includes a first pair of guide rollers, a second pair of guide rollers, and a third pair of guide rollers each of said first, second and third pair of guide rollers being positioned on a curve such that each said first, second and third pair of guide rollers is capable of accommodating a pipe of a different diameter than the other of said first, second and third pair of guide rollers.

8. The pipe cutter apparatus of claim 3, wherein, when said lid is in said storage position, said handle extends outside of said housing to provide a means for carrying the pipe cutter apparatus.

9. The pipe cutter apparatus of claim 4, further comprising a cushion on said adjustable bracket.

10. The pipe cutter apparatus of claim 9, wherein said cleaning brush includes a distal portion, a mid portion, and a grooved portion, said grooved portion being of larger diameter than said mid portion and having a groove therein, said mid portion being of larger diameter then said distal portion.

11. The pipe cutter apparatus of claim 5, wherein said cleaning brush includes a distal portion having a diameter, a mid portion having a larger diameter than said distal portion, a base portion having a brushing surface, and a sleeve between said mid portion and said base portion, wherein said brushing surface of said base portion lies proximate and substantially perpendicular to said sleeve.

12. The pipe cutter apparatus of claim 11, further comprising a brush housing having at least one aperture therein for receiving a pipe or pipe fitting, said aperture being positioned such that a pipe or pipe fitting, inserted through said at least one aperture may rest on said sleeve.

13. A pipe cutter apparatus comprising:

a motor:

a shaft operatively connected to and rotated by said motor;

a pipe-driving cutting wheel extending radially from said shaft and rotated therewith;

a pipe conveyor adjacent said pipe-driving cutting wheel, wherein, when a pipe is placed in said pipe conveyor and caused to engage said cutting wheel, the operation of said motor to rotate said shaft and said cutting wheel causes the pipe to be rotated by said cutting wheel such that the pipe and the pipe cutter apparatus do not have to be simultaneously manipulated.

14. The pipe cutter apparatus of claim 13, wherein said cutting wheel has a diameter of at least about two inches.

15. The pipe cutter apparatus of claim 13, wherein said cutting wheel comprises a serrated disc having saw teeth about its peripheral edge; and a pair of O-rings, said serrated disc being sandwiched between said pair of O-rings such that said saw teeth about said peripheral edge of said serrated disc are inset from said O-rings.

16. A pipe cutter apparatus comprising:

a motor;

a shaft operatively connected to and rotated by said motor;

a cutting wheel extending radially from said shaft and rotated therewith;

a cleaning brush attached to said shaft and rotated therewith at a distal end thereof, said cutting wheel being disposed between said cleaning brush and said motor;

a pipe conveyor adjacent said cutting wheel and operable to urge a pipe placed therein into engagement with said cutting wheel.

17. The pipe cutter apparatus of claim 16, wherein said cleaning brush includes a distal portion, a mid portion, and a grooved portion, said grooved portion being of larger diameter than said mid portion and having a groove therein, said mid portion being of larger diameter then said distal portion.

18. The pipe cutter apparatus of claim 16, wherein said cleaning brush includes a distal portion having a diameter, a mid portion having a larger diameter than said distal portion, a base portion having a brushing surface, and a sleeve between said mid portion and said base portion, wherein said brushing surface of said base portion lies adjacent and substantially perpendicular to said sleeve.

* * * * *